(12) United States Patent
Gazave et al.

(10) Patent No.: US 10,371,309 B2
(45) Date of Patent: Aug. 6, 2019

(54) INTERFACE FOR A VALVE FOR A CRYOGENIC FLUID DUCT

(71) Applicant: SAFRAN AIRCRAFT ENGINES, Paris (FR)

(72) Inventors: Robert Gazave, Panilleuse (FR); Frédérick Millon, Saint Marcel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 15/128,843

(22) PCT Filed: Mar. 18, 2015

(86) PCT No.: PCT/FR2015/050661
§ 371 (c)(1),
(2) Date: Sep. 23, 2016

(87) PCT Pub. No.: WO2015/145027
PCT Pub. Date: Oct. 1, 2015

(65) Prior Publication Data
US 2017/0184247 A1 Jun. 29, 2017

(30) Foreign Application Priority Data

Mar. 27, 2014 (FR) ...................................... 14 52620

(51) Int. Cl.
*F16K 25/00* (2006.01)
*F16L 59/14* (2006.01)
(Continued)

(52) U.S. Cl.
CPC ............ *F16L 59/141* (2013.01); *F16K 27/02* (2013.01); *F16L 59/161* (2013.01)

(58) Field of Classification Search
CPC ........ F15K 27/02; F16L 59/141; F16L 59/161
(Continued)

(56) References Cited

U.S. PATENT DOCUMENTS 928,751 A * 7/1909 Harcourt ................. F16K 27/02
251/223
946,877 A * 1/1910 Rothchild ............... F16K 27/02
137/584
(Continued)

OTHER PUBLICATIONS

International Search Report in corresponding International Application No. PCT/FR2015/050661 dated Jul. 9, 2015 (6 pages—English Translation included).

*Primary Examiner* — Umashankar Venkatesan
(74) *Attorney, Agent, or Firm* — Bookoff McAndrews, PLLC

(57) ABSTRACT

An assembly comprising a duct (1) for passing a flow of cryogenic fluid, and a valve (2);

the assembly being characterized in that the duct (1) includes an interface for inserting the valve, the interface forming an internal abutment (51) and an external abutment (52);

the valve (2) being configured in such a manner as to be inserted into said insertion interface by sliding, the valve (2) comprising a valve body (3) presenting a first end (31) and a second end (32), the valve body (3) being adapted to be bolted in said insertion interface in such a manner that the first end (31) and the second end (32) come into abutment respectively against the internal abutment (51) and against the external abutment (52), the assembly including an internal sealing element (61) arranged between the internal abutment (51) and the first end (31), and an external sealing element (62) arranged between the external abutment (52) and the second end (32).

8 Claims, 1 Drawing Sheet

(51) Int. Cl.
*F16K 27/02* (2006.01)
*F16L 59/16* (2006.01)

(58) Field of Classification Search
USPC .......................................... 137/15.18, 454.2
See application file for complete search history.

(56) References Cited

U.S. PATENT DOCUMENTS

| | | | | |
|---|---|---|---|---|
| 3,037,519 | A * | 6/1962 | Nevill, Jr. | F16K 1/34 137/246.12 |
| 3,825,225 | A * | 7/1974 | Demi | F16K 27/02 137/454.5 |
| 4,161,187 | A * | 7/1979 | Bauer | F16K 1/34 137/375 |
| 4,623,002 | A * | 11/1986 | Schoonover | B01J 4/001 137/340 |
| 5,286,001 | A * | 2/1994 | Rafeld | B29C 37/0082 251/366 |
| 7,363,937 | B2 * | 4/2008 | Suter | F16K 47/08 137/375 |
| 7,669,609 | B2 * | 3/2010 | Hansen, III | F16K 3/243 137/269 |

* cited by examiner

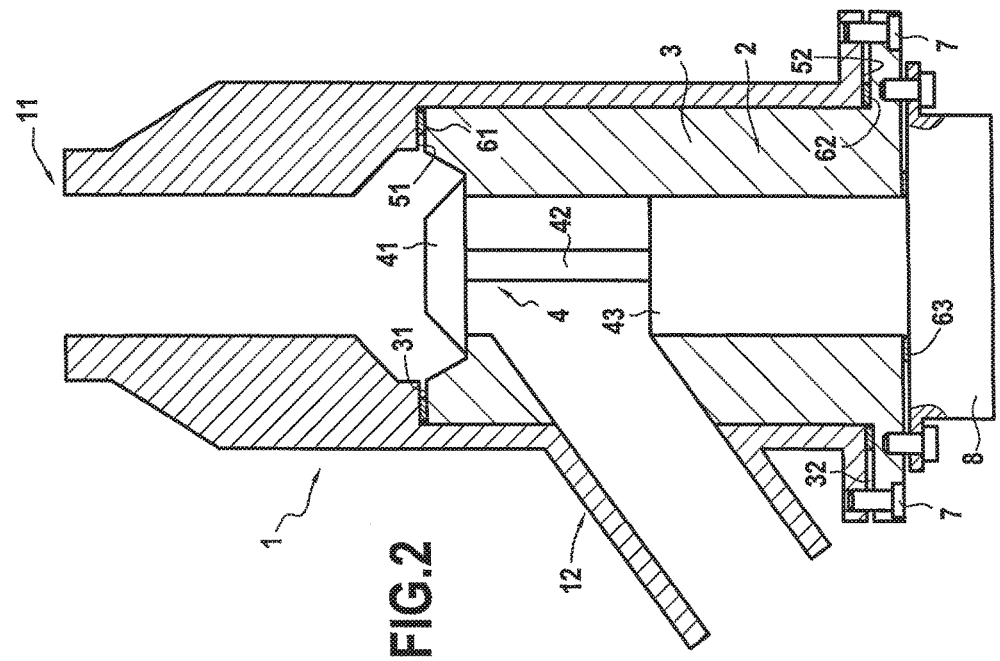
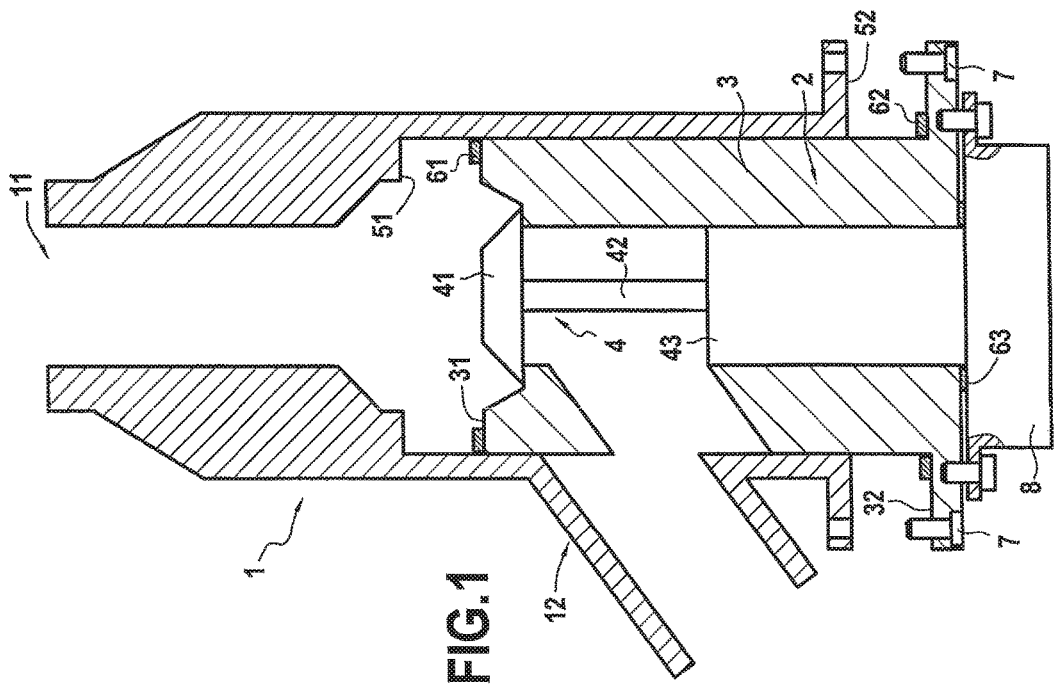

INTERFACE FOR A VALVE FOR A CRYOGENIC FLUID DUCT

CROSS-REFERENCE TO RELATED APPLICATIONS

This application is the U.S. national phase entry under 35 U.S.C. § 371 of International Application No. PCT/FR2015/050661, filed on Mar. 18, 2015, which claims priority to French Patent Application No. 1452620, filed on Mar. 27, 2014.

GENERAL TECHNICAL FIELD

The present invention relates to integrating components in a space vehicle engine, and in particular integrating a valve in a cryogenic fluid duct.

STATE OF THE ART

The various components of a space vehicle engine are conventionally integrated by bolting, by welding, or by a combination of bolting and welding.

Assembling the various components by bolting is advantageous in that it enables the engine to be completely disassembled and reassembled, e.g. for maintenance operations. Nevertheless, such assembly leads to an increase in the total weight of the system, which is particularly problematic in space applications, and also to an increase in its cost because of the need for additional parts such as flange connections and gaskets. Furthermore, increasing the number of sealing elements means that such an assembly method is detrimental to the reliability of the assembly; in particular because of the temperatures and pressures that can be reached in such engines, and also because of the nature of the fluids.

Assembling the various components together by welding serves to remedy those problems of weight and reliability, but it does not enable the engine to be disassembled in non-destructive manner, and it thus makes maintenance operations and replacing components of the engine very problematic.

Mixed assemblies have also been used, in which combined use is made both of welding and of bolting. Welding is then typically used for assembling the connections that are subjected to the greatest stresses, such as connections between components that are subjected to high temperatures or pressures, or indeed connections for which bolting would lead to an excessive increase in weight. Bolting is used for the other connections, in order to enable the engine to be disassembled.

Nevertheless, that solution is of limited interest on numerous types of engine, in that most of the connections are always made by bolting, with the drawbacks that stem therefrom.

The present invention thus seeks to improve assembling a space vehicle engine so as to enable it to be disassembled, while nevertheless reducing weight and cost, and without impacting reliability.

SUMMARY OF THE INVENTION

In order to satisfy these various problems, at least in part, the present invention proposes an assembly comprising a cryogenic fluid flow duct and a valve adapted to shut said duct selectively;

the assembly being characterized in that the duct includes an interface for inserting the valve, the interface forming an internal abutment inside the duct and an external abutment outside the duct;

the valve being configured in such a manner as to be inserted into said insertion interface by sliding, the valve comprising a valve body presenting a first end and a second end, the valve body being adapted to be bolted in said insertion interface in such a manner that the first end and the second end come into abutment respectively against the internal abutment and against the external abutment of the duct, the assembly including an internal sealing element arranged between the internal abutment of the duct and the first end of the valve body, and an external sealing element arranged between the external abutment of the duct and the second end of the valve body.

In a particular implementation, said duct includes a first portion and a second portion relative to the valve, said first and second portions not being in alignment with each other and forming a deflection in the flow of fluid in the duct, the insertion interface being arranged in line with one of the first and second portions in such a manner that the valve is inserted in the duct in alignment with said first portion or said second portion. The internal abutment and the external abutment of the duct are typically formed by two parallel surfaces, and wherein the internal sealing element is more flexible than the external sealing element.

The valve may also comprise an actuator assembled on said valve body, outside the duct.

By way of example, the valve is of the type having a valve member, a cylindrical plug, or a tube.

The flow of fluid in the duct is typically configured in such a manner that the first portion is a portion that is upstream relative to the valve, and the second portion is a portion that is downstream relative to the valve.

Alternatively, the flow of fluid in the duct may equally well be configured in such a manner that the first portion is a portion that is downstream relative to the valve, and the second portion is a portion that is upstream relative to the valve.

The valve body and/or the duct may also include indexing means suitable for orienting the valve body while it is being inserted in the duct.

The invention also provides a space vehicle engine including such an assembly, in which the second portion and the first portion of the duct are assembled to the engine by welding.

SUMMARY OF THE FIGURES

Other characteristics, objects, and advantages of the invention appear from the following description, which is purely illustrative and nonlimiting, and which should be read with reference to accompanying FIGS. 1 and 2, which are diagrams showing the mounting of a valve on a duct in an aspect of the invention.

In all of the figures, elements that are in common are identified by numerical references that are identical.

DETAILED DESCRIPTION

FIGS. 1 and 2 are diagrams showing a space vehicle engine duct 1 on which a valve 2 is mounted.

FIG. 1 shows the valve 2 partially engaged in the duct 1, while FIG. 2 shows the valve 2 fastened to the duct 1 in such a manner as to be operational. The duct 1 comprises a first portion 11 and a second portion 12 that are defined relative to the valve 2.

By way of example, the first portion 11 corresponds to the admission of fluid into the duct 1, and the second portion 12 corresponds to fluid delivery by the duct 1, it being understood that the opposite flow direction is also possible.

The first portion 11 may thus be a downstream portion and the second portion 12 may be an upstream portion relative to the valve 2, or vice versa the first portion 11 may be an upstream portion and the second portion 12 may be a downstream portion relative to the valve 2.

The first and second portions 11 and 12 are connected to other components of a space vehicle engine (not shown in the figures) by welding, thus ensuring that the duct 1 presents good mechanical strength and good sealing.

The duct 1 has a valve 2 that is adapted to close the duct 1 selectively, thus enabling the flow rate of fluid passing along the duct 1 to be controlled. The valve 2 comprises a valve body 3 adapted to be fastened to the duct 1, and a shutter 4 that is movably mounted relative to the valve body 3, the valve body 3 defining a seat portion of the duct 1 against which the shutter 4 can come into abutment. In the embodiment shown, the shutter 4 comprises a valve member 41 coupled to a stem 42 that is slidably mounted in a housing 43 that is stationary relative to the valve body 3, such that sliding the stem 42 can determine total, partial, or no shutting of the duct 1 by the valve member 41.

In order to assemble the valve 2 to the duct 1, the duct 1 has an insertion interface for the valve 2, the valve being configured in such a manner as to be inserted in said insertion interface.

The insertion interface has two abutments: an internal abutment 51 and an external abutment 52.

The internal abutment 51 is formed in the inside volume of the duct 1, in the flow section for fluid inside the duct 1.

The external abutment 52 is formed outside the duct 1, on an interface of the duct 1 that does not lie in the fluid flow section.

In the embodiment shown in the figures, the insertion interface defines a cylindrical volume into which the valve 2 can be inserted. The external abutment 52 is formed by an annular portion forming a bearing surface outside the duct 1, while the internal abutment 51 is formed by an annular portion provided inside the duct 1.

The valve body 3 presents a first end 31 and a second end 32 that are adapted to come into abutment respectively against the internal abutment 51 and against the external abutment 52 when the valve 2 is inserted in the insertion interface of the duct 1.

The first portion 11 and the second portion 12 of the duct 1 are two linear portions that do not lie on the same axis; the valve 2 is thus positioned at a deflection point for the flow of fluid in the duct 1.

The insertion interface for the valve 2 is made in line with one of the first and second portions 11 and 12 of the duct 1. In the example shown, the insertion interface for the valve 2 is made in line with the first portion 11 of the duct 1; the valve 2 is thus inserted into the insertion interface by sliding along the axis of the first portion 11 of the duct 1.

The internal abutment 51 and the external abutment 52 are then advantageously formed by two parallel surfaces, which surfaces are typically perpendicular or inclined relative to the axis of the first portion 11 of the duct 1. The first end 31 and the second end 32 of the valve body 3 are then advantageously likewise parallel to each other and configured in such a manner as to bear in plane manner against said internal and external abutments 51 and 52 when the valve 2 is inserted in the duct 1.

The shutter 4 is dimensioned in such a manner as to present an outside diameter that is less than the outside diameter of the valve body 3, so that the valve body 3 and the shutter 4 can be inserted together into the insertion interface for the valve 2 by sliding.

The valve body 3 and/or the duct 1 typically include indexing means so as to ensure that the valve body 3 is appropriately oriented relative to the duct 1 while it is being inserted.

Two interfaces can thus be distinguished between the duct 1 and the valve 2:

an internal interface between the internal abutment 51 of the duct 1 and the first end 31 of the valve body 3; and an external interface between the external abutment 52 the duct 1 and the second end 32 of the valve body 3.

The internal interface is situated inside the duct 1, within the fluid flow. The external interface is situated outside the duct 1, outside the fluid flow.

Sealing elements are advantageously positioned so as to provide sealing for the assembly comprising the duct 1 and the valve 2 inserted in the duct 1. The sealing elements are advantageously of the pressure-seal type, with their sealing increasing with increasing pressure to which they are subjected.

An internal sealing element 61 is thus positioned at the internal interface between the internal abutment 51 and the first end 31, and an external sealing element 62 is positioned at the external interface between the external abutment 52 and the second end 32.

By way of example, the internal and external sealing elements 61 and 62 are metal gaskets of the C-ring type adapted for use with a cryogenic fluid, and they are deformed while the valve 2 is being inserted in the duct 1. Typically, the internal sealing element 61 is more flexibile than the external sealing element 62, such that during insertion of the valve 2 in the duct 1, deformation is observed in the internal sealing element 61 initially, and subsequently deformation is observed both in the internal sealing element 61 and in the external sealing element 62.

The internal sealing element 61 thus acts as a buffer, and compensates for any slack due to manufacturing tolerances and to assembling the parts.

Specifically, the internal sealing element 61 performs a role that is less important than the external sealing element 62. Specifically, the external sealing element is subjected to a pressure difference between the outside medium and the pressure within the duct 1, while the internal sealing element 61 is subjected only to a pressure difference that results from head losses in the valve 2.

Thereafter, the valve 2 is bolted to the duct 1 via assembly means, typically through the external abutment 52, and in such a manner that the assembly means are isolated from the fluid flowing in the duct 1 by the external sealing element 62.

The assembly means 7 thus typically serve to clamp the valve 2 in the duct 1, and thus to clamp the sealing elements 61 and 62 at the internal interface and at the external interface so as to provide sealing for the assembly made up in this way.

An actuator 8 is assembled on the valve body 3, the actuator 8 typically controlling the opening and closing of the valve 2. The actuator 8 may be assembled to the valve body 3 by welding, by bolting, or by any other appropriate assembly technique. In the embodiment shown, the actuator 8 is mounted on the valve body 3 by bolting. In this example, a valve sealing element 63 is thus positioned at the interface between the actuator 8 and the valve body 3. The way in which the actuator 8 is assembled on the valve body 3 depends in particular on the reliability of the selected actuator, and thus on whether or not there might be any need to be able to remove it independently of the valve 2.

The proposed structure thus enables a valve 2 to be assembled on a duct 1 in a manner that satisfies both of the above-raised problems simultaneously, i.e. it enables the valve to be removed while minimizing the total weight of the assembly, and while minimizing any risk of leakage. Specifically, the duct 1 may be assembled to an engine by welding, with only the valve 2 being bolted.

The invention claimed is:

1. An assembly comprising a duct for passing a flow of cryogenic fluid and a valve adapted to shut said duct selectively;
   the assembly being characterized in that the duct includes an interface for inserting the valve, the interface forming an internal abutment inside the duct and an external abutment outside the duct;
   the valve being configured so as to be removably inserted into said insertion interface by sliding, the valve comprising a valve body presenting a first end and a second end, the valve body being adapted to be removably bolted in said insertion interface so that the first end and the second end come into abutment respectively against the internal abutment and against the external abutment of the duct, the assembly including an internal sealing element arranged between the internal abutment of the duct and the first end of the valve body, and an external sealing element arranged between the external abutment of the duct and the second end of the valve body; and
   wherein the valve body and/or the duct include(s) an index suitable for orienting the valve body while it is being inserted in the duct, and
   wherein said duct includes a first portion and a second portion relative to the valve, said first and second portions:
      not being in alignment with each other;
      not being perpendicular with each other; and
      forming a deflection in the flow of fluid in the duct,
   wherein the insertion interface is arranged in line with one of the first and second portions so that the valve is inserted in the duct in alignment with said first portion or said second portion.

2. An assembly according to claim 1, wherein the internal abutment and the external abutment of the duct are formed by two parallel surfaces, and wherein the internal sealing element is more flexible than the external sealing element.

3. An assembly according to claim 1, wherein said valve further includes an actuator assembled on said valve body, outside the duct.

4. An assembly according to claim 1, wherein the valve is of the type having a valve member, a cylindrical plug, or a tube.

5. An assembly according to claim 1, wherein the flow of fluid in the duct is configured so that the first portion is a portion that is upstream relative to the valve, and the second portion is a portion that is downstream relative to the valve.

6. An assembly according to claim 1, wherein the flow of fluid in the duct is configured so that the first portion is a portion that is downstream relative to the valve, and the second portion is a portion that is upstream relative to the valve.

7. A space vehicle engine including an assembly according to claim 1, wherein the second portion and the first portion of the duct are assembled to the engine by welding.

8. An assembly according to claim 2, wherein said valve further includes an actuator assembled on said valve body, outside the duct.

* * * * *